(12) United States Patent
Wang et al.

(10) Patent No.: US 12,301,120 B2
(45) Date of Patent: May 13, 2025

(54) DC-TO-DC CONVERTER WITH FREEWHEELING CIRCUITS

(71) Applicant: Huawei Technologies Co., Ltd., Guangdong (CN)

(72) Inventors: Luyu Wang, Shenzhen (CN); Shengyong Dai, Dongguan (CN); Grover Victor Torrico-Bascopé, Kista (SE); Qingzu Hong, Shenzhen (CN); Xiao Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 227 days.

(21) Appl. No.: 17/966,084

(22) Filed: Oct. 14, 2022

(65) Prior Publication Data
US 2023/0036842 A1 Feb. 2, 2023

Related U.S. Application Data

(63) Continuation of application No. PCT/EP2020/060851, filed on Apr. 17, 2020.

(51) Int. Cl.
*H02M 3/335* (2006.01)
*H02M 1/32* (2007.01)
*H02M 1/36* (2007.01)

(52) U.S. Cl.
CPC ......... *H02M 3/33584* (2013.01); *H02M 1/32* (2013.01); *H02M 1/36* (2013.01); *H02M 3/33561* (2013.01); *H02M 3/33592* (2013.01)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 6,191,960 B1 2/2001 Fraidlin et al.
6,259,235 B1 * 7/2001 Fraidlin ................ H02M 3/158
323/290

(Continued)

FOREIGN PATENT DOCUMENTS

CN 202178708 U * 3/2012
CN 203027134 U 6/2013
(Continued)

OTHER PUBLICATIONS

Ryosuke Kasashima et al., Implementation and Power-Loss Characteristics of 400-V, 10-kW, 20-kHz Three-way Isolated DC/DC Converter as A Power Routing Unit for Constructing Microgrid Systems, IEEE Xplore, Nov. 22-25, 2016, 4 pages.

(Continued)

*Primary Examiner* — Jeffrey A Gblende
(74) *Attorney, Agent, or Firm* — WOMBLE BOND DICKINSON (US) LLP

(57) ABSTRACT

The present disclosure relates to a DC-to-DC converter. The DC-to-DC converter includes a first port coupled to a first full bridge and a transformer coupled to the first full bridge and to a second full bridge. The DC-to-DC converter further includes a second port coupled to the second full bridge; a first inductor coupled between the second full bridge and the second port; and a first freewheeling circuit including a first diode being coupled in series with a switch. The first freewheeling circuit is further coupled in parallel with the first inductor between the second full bridge and the second port. Thereby, the DC-to-DC converter has a wide input and wide output (WIWO) range and a voltage gain that is linear.

19 Claims, 11 Drawing Sheets

(58) Field of Classification Search
CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491

See application file for complete search history.

(56) References Cited

U.S. PATENT DOCUMENTS

| | | | | |
|---|---|---|---|---|
| 10,193,464 | B2* | 1/2019 | Schekulin | H02M 3/33584 |
| 11,101,734 | B2* | 8/2021 | Lin | H02M 3/158 |
| 11,725,808 | B2* | 8/2023 | Peng | H05B 45/00 |
| | | | | 315/294 |
| 2004/0066178 | A1* | 4/2004 | Mizoguchi | H02M 3/158 |
| | | | | 323/205 |

FOREIGN PATENT DOCUMENTS

| | | | | |
|---|---|---|---|---|
| CN | 104143919 | A | | 11/2014 |
| CN | 104917412 | A | | 9/2015 |
| CN | 107623365 | A | | 1/2018 |
| KR | 2018004673 | A | * 1/2018 | ........ H02M 3/33584 |
| KR | 20180004673 | A | | 1/2018 |
| KR | 101923317 | B1 | | 11/2018 |

OTHER PUBLICATIONS

Nie Hou et al., Overview and Comparison of Modulation and Control Strategies for a Nonresonant Single-Phase Dual-Active-Bridge DC DC Converter, IEEE, Jul. 12, 2019, 25 pages.

Hariharan Krishnaswami et al., Three-Port Series-Resonant DC DC Converter to Interface Renewable Energy Sources With Bidirectional Load and Energy Storage Ports, IEEE, 10, Oct. 2009, 9 pages.

* cited by examiner

DC-TO-DC CONVERTER WITH FREEWHEELING CIRCUITS

CROSS-REFERENCE TO RELATED APPLICATIONS

This application is a continuation of International Application No. PCT/EP2020/060851, filed on Apr. 17, 2020, the disclosure of which is hereby incorporated by reference in its entirety.

TECHNICAL FIELD

The present disclosure relates to a direct current (DC) to direct current converter. More particularly, the present disclosure relates to a DC-to-DC converter with freewheeling circuits.

BACKGROUND

Electrical vehicles have harsh requirements on power density, cost, and system integration. On the other hand, bidirectional power transfer is required by automotive original equipment manufacturers (OEMs). As such, on board chargers (OBCs) with three port DC-to-DC output stage after power factor correction (PFC) is a trend for future OBC design.

One such conventional three port topology is bidirectional DC-DC converter based on dual active bridge (DAB). The DAB technique suffers from its high reactive power at light and medium load when single phase shift (SPS) modulation is used. In order to achieve higher efficiency at light or medium load conditions, TPS modulation is required which is a complex control algorithm and normally hard to implement. Applying TPS control in a three port topology is even more challenging.

One such conventional three port topology is the resonant solution topology often used to boost system efficiency. This solution can achieve higher efficiency, but LLC topology (two inductors LL and a capacitor C) has difficulty in fulfilling wide input and wide output (WIWO) requirements when the input/output voltage ranges of a DC-DC converter are more than 40% of its nominal input/output voltages.

SUMMARY

An objective of examples of the present disclosure is to provide a solution which mitigates or solves the drawbacks and problems of conventional solutions.

Another objective of examples of the present disclosure is to provide a novel topology suitable for a bi-directional DC-to-DC converter with wide input and wide output voltage requirements in any application that requires bi-directional power transfer with high efficiency and high power density.

According to some embodiments, the above mentioned and other objectives are achieved with a DC-to-DC converter comprising
  a first port comprising a first side configured to be coupled to a DC bus and a second side coupled to a first full bridge, wherein the first full bridge comprises a first switch, a second switch, a third switch and a fourth switch;
  a transformer comprising a primary winding coupled to the first full bridge and a secondary winding coupled to a second full bridge, wherein the second full bridge comprises a fifth switch, a sixth switch, a seventh switch and an eight switch;
  a second port comprising a first side coupled to the second full bridge and a second side configured to be coupled to a first battery;
  a first inductor coupled between the second full bridge and the first side of the second port; and
  a first freewheeling circuit comprising a first diode coupled in series with a ninth switch, wherein the first freewheeling circuit is coupled in parallel with the first inductor between the second full bridge and the first side of the second port.

A port herein can be considered as an input and/or output terminal. Therefore, the port can be configured to act as an input or an output depending on the operating mode of the DC-to-DC converter.

A full bridge herein can be understood as two half bridges coupled or connected in parallel to each other. A half bridge may be formed by two switches and two freewheeling diodes.

The DC-to-DC converter may operate in a forward mode in which the current direction is from the first port to the second port. The DC-to-DC converter may further operate in a backward mode in which the current direction is from the second port to the first port.

An advantage of the DC-to-DC converter is that it has a wide input and wide output range e.g., suitable for electrical vehicle applications. Further, voltage gain of the DC-to-DC converter is linear.

In some embodiments of a DC-to-DC converter, when operating in a first backward mode in a current direction from the second port to the first port, the DC-to-DC converter is configured to
  i) operate the ninth switch in its saturation region; and
  ii) switch ON the fifth and the eight switches during a first time period,
  iii) switch OFF the fifth, the sixth, the seventh and the eight switches during a second timer period succeeding the first time period, and
  iv) switch ON the sixth and the seventh switches during a third time period succeeding the second time period,
  v) switch OFF the fifth, the sixth, the seventh and the eight switches during a fourth timer period succeeding the third time period; and repeat ii) to v) until a voltage at the DC bus is equal to or above a first threshold voltage.

That a switch is switched ON can in this disclosure be understood to mean that the switch has a low impedance and to be able to conduct a current.

That a switch is switched OFF can in this disclosure be understood to mean that the switch has a high impedance and not be able to conduct a current.

An advantage of the DC-to-DC converter according to some embodiments is that a soft-start function of the first backward mode operation is provided.

In some embodiments of a DC-to-DC converter, the DC-to-DC converter further comprises
  a first protection circuit coupled between the second full bridge and the first side of the second port and in parallel to the second full bridge.

An advantage of the DC-to-DC converter according to some embodiments is that the switches at the second port are protected from over voltage/current, e.g., due to failure in a controller configured to control the switches of the DC-to-DC converter.

In some embodiments of a DC-to-DC converter, the first protection circuit comprises a first Zener diode and a second Zener diode coupled in series with each other and in opposite directions; or a first varistor.

In some embodiments of a DC-to-DC converter, the DC-to-DC converter further comprises a third port comprising a first side coupled to a Y-circuit and a second side S2P3 configured to be coupled to a second battery, wherein the Y-circuit is coupled to a centre tapped winding of the transformer and comprises an eleventh switch, a twelfth switch and a thirteenth switch.

An advantage of the DC-to-DC converter according to some embodiments is that the DC-to-DC converter can transfer energy/power to a third port. Further, there is no power decoupling between the second port and the third port.

In some embodiments of a DC-to-DC converter, the source pin or emitter pin of each switch is coupled to a common node of the Y-circuit.

An advantage of the DC-to-DC converter according to some embodiments is that the voltage at the third port can be modulated when the third port is configured as an output port.

In some embodiments of a DC-to-DC converter, the first battery is a high voltage battery and the second battery is a low voltage battery.

An advantage of the DC-to-DC converter according to some embodiments is that it can transfer energy/power between the high voltage battery and the low voltage battery, and vice versa.

In some embodiments of a DC-to-DC converter, the DC-to-DC converter further comprises a second inductor coupled between the Y-circuit and the first side of the third port; and a second freewheeling circuit comprising a second diode coupled in series with a tenth switch, wherein the second freewheeling circuit is coupled in parallel with the second inductor between the Y-circuit and the first side of the third port.

An advantage of the DC-to-DC converter according to some embodiments is that the third port can be configured to send or receive power/energy.

In some embodiments of a DC-to-DC converter, the DC-to-DC converter is configured to when operating in a second backward mode in a current direction from the third port to the first port:

i) control the tenth switch to operate in its saturation region, and ii) switch ON the twelfth switch; and iii) switch ON the eleventh switch during a first time period, iv) switch OFF the eleventh and the thirteenth switches during a second timer period succeeding the first time period, and v) switch ON the thirteenth switch during a third time period succeeding the second time period, vi) switch OFF the eleventh and the thirteenth switches during a fourth timer period succeeding the third time period; and repeat iii) to vi) until a voltage at the DC bus is equal to or above a second threshold voltage.

An advantage of the DC-to-DC converter according to some embodiments is that the DC-to-DC converter provides a soft-start function for the second backward mode operation.

In some embodiments of a DC-to-DC converter, the DC-to-DC converter further comprises a second protection circuit coupled between the Y-circuit and the first side of the third port.

An advantage of the DC-to-DC converter according to some embodiments is that the switches at the third port are protected from over voltage/current. e.g., due to failure in a controller configured to control the switches of the DC-to-DC converter.

In some embodiments of a DC-to-DC converter, the second protection circuit comprises a third Zener diode and a fourth Zener diode coupled in series with each other and in opposite directions; or a second varistor.

In some embodiments of a DC-to-DC, the DC-to-DC converter further comprises a freewheeling diode coupled in parallel with the second protection circuit and forming a freewheeling path when the third port operate as an output port.

An advantage of the DC-to-DC converter according to some embodiments is that the output voltage at the third port can be controlled.

In some embodiments of a DC-to-DC converter, the DC-to-DC converter further comprises at least one of a first current sensor coupled between the second full bridge and the first side of the second port and configured to provide a first set of measured current values;

a second current sensor coupled between the Y-circuit and the first side of the third port and configured to provide a second set of measured current values;

a controller configured to control the switches of the DC-to-DC converter based on at least one of the first set of measured current values and the second set of measured current values.

An advantage of the DC-to-DC converter according to some embodiments is that the switches of the DC-to-DC converter can be controlled based on the first set of measured current values and the second set of measured current values for improved switching.

In some embodiments of a DC-to-DC converter, the DC-to-DC converter further comprises a clamp circuit comprising a first clamp diode, a second clamp diode and a clamp inductor coupled between the first full bridge and the primary winding of the transformer.

Further applications and advantages of the examples of the present disclosure will be apparent from the following detailed description.

BRIEF DESCRIPTION OF THE DRAWINGS

The appended drawings are intended to clarify and explain different examples of the present disclosure, in which.

DETAILED DESCRIPTION

A phase shift full bridge (PSFB) topology for DC-to-DC converters is widely used in the industry due to its capability of WIWO and the possibility to use simple control algorithms for controlling such PSFB converters. Backward operation of the PSFB is a boost converter with galvanic isolation provided by a transformer. There are however two issues with such PSFB converters.

A first issue is that the boost converter often needs a soft start phase prior to steady state operation when operating in a backward mode. For a boost converter without an isolation barrier between input and output, the soft start function can be easily implemented via a relay and a power resistor. However, due to the existence of an isolation barrier, i.e. a transformer, this solution is not applicable for an isolated boost converter.

A second issue is that when the PSFB converter is operating in the backward mode, it acts as a current source converter, caused by error of micro controller or other control mechanism of the converter. The stored energy may cause overvoltage across switches of the converter and thereby damage the switching elements of the converter.

Therefore, a two port and a three port DC-DC converter topology is herein disclosed which solve the above mentioned issues. The two port DC-DC converter and the three port DC-DC converter according to the present disclosure are suitable for two port and three port bidirectional DC-DC conversion, respectively, with WIWO voltage of a power conditioning system. The disclosed DC-to-DC converters can be used in numerous applications such as in electrical vehicle (EV), on board chargers (OBC), or any other applications that require two port or three port bidirectional DC-DC power conversion.

Figure 1:
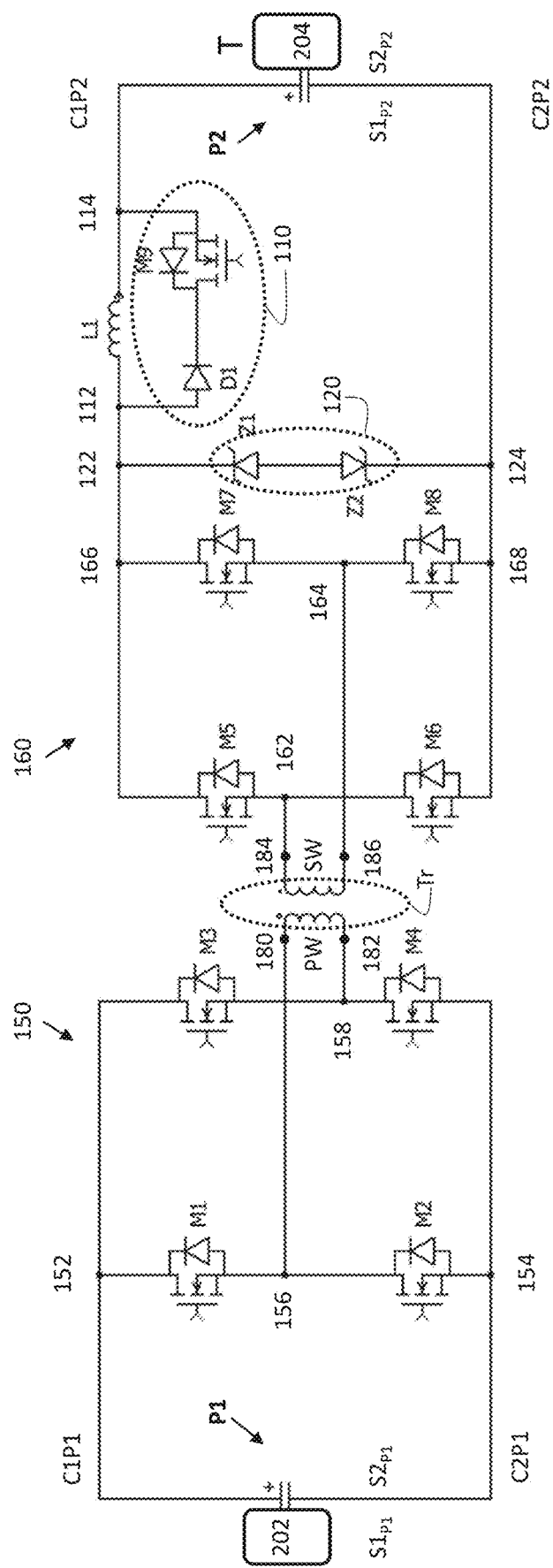
FIG. 1 shows a DC-to-DC converter with a two port topology according to some embodiments.

FIG. 1 shows a DC-to-DC 100 converter with a two port topology according to some embodiments. The DC-to-DC converter 100 comprises a first port P1 configured to be coupled to a DC bus 202 and second port P2 configured to be coupled to a first battery 204. Thus, the DC-to-DC converter 100 is configured to be coupled between the DC bus 202 and the first battery 204 and may perform bi-directional power conversion between the DC bus 202 and the first battery 204. The DC-to-DC converter 100 may operate as a buck/boost converter.

With reference to FIG. 1, the first port P1 comprises a first side $S1_{P1}$ configured to be coupled to the DC bus 202 and a second side $S2_{P1}$ coupled to a first full bridge 150. The first full bridge 150 comprises a first switch M1, a second switch M2, a third switch M3 and a fourth switch M4.

The DC-to-DC converter 100 further comprises a transformer Tr comprising a primary winding PW coupled to the first full bridge 150 and a secondary winding SW coupled to a second full bridge 160. The second full bridge 160 comprises a fifth switch M5, a sixth switch M6, a seventh switch M7 and an eight switch M8.

The second port P2 comprises a first side $S1_{P2}$ coupled to the second full bridge 160 and a second side $S2_{P2}$ configured to be coupled to the first battery 204. In FIG. 1, the upper side of the second port P2 is a first coupling point C1P2 of the second port P2 and the lower side is a second coupling point C2P2 of the second port P2.

The first full bridge 150 has four connection/coupling points/nodes. i.e., 152, 154, 156 and 158, and may be coupled between the second side $S2_{P1}$ of the first port P1 and the primary winding PW of the transformer Tr in the following way:

A first connection point 152 of the first full bridge 150 is coupled to a first coupling point C1P1 of the first port P1, while a second connection point 154 of the first full bridge 150 is coupled to a second coupling point C2P1 of the first port P1.

A third connection point 156 of the first full bridge 150 is connected to a first connection point 180 of the primary winding PW of the transformer Tr, while a fourth connection point 158 of the first full bridge 150 is coupled to a second connection point 182 of the primary winding PW of the transformer Tr.

In the first full bridge 150, the first switch M1 is coupled between the first 152 and the third 156 connection points, the second switch M2 is coupled between the second 154 and the third 156 connection points, the third switch M3 is coupled between the first 152 and the fourth 158 connection points, and the fourth switch M4 is coupled between the second 154 and the fourth 158 connection points.

The second full bridge 160 also has four connection/coupling points, i.e. 162, 164, 166 and 168, and is coupled between the secondary winding SW of the transformer Tr and the first side $S1_{P2}$ of the second port P2 in the following way:

A first connection point 162 of the second full bridge 160 is coupled/connected to a first connection 184 of the secondary winding SW of the transformer Tr, while a second connection point 164 of the second full bridge 160 is coupled to a second connection 186 of the secondary winding SW of the transformer Tr.

A third connection point 166 of the second full bridge 160 is coupled to a high voltage side of the first side $S1_{P2}$ of the second port P2, while a fourth connection point 168 of the second full bridge 160 is coupled to a low voltage side of the first side $S1_{P2}$ of the second port P2.

In the second full bridge 160, the fifth switch M5 is coupled between the first 162 and the third 166 connection points, the sixth switch M6 is coupled between the first 162 and the fourth 168 connection points, the seventh switch M7 is coupled between the second 164 and the third 166 connection points, and the eighth switch M8 is coupled between the second 164 and the fourth 168 connection points.

The DC-to-DC converter 100 further comprises a first inductor L1 coupled between the second full bridge 160 and the first side $S1_{P2}$ of the second port P2. The first inductor L1 function as a controllable output filter for the second port P2. In FIG. 1, the first inductor L1 is coupled between the third connection point 166 of the second full bridge 160 and an upper side of the first side $S1_{P2}$ of the second port P2. Thus, the first inductor L1 is in this example coupled to the upper side of the second port P2, which in FIG. 1 is the high voltage HV side. However, the first inductor L1 may in examples instead be coupled to the lower side of the second port P2, as will be described later with reference to FIGS. 8-10.

The DC-to-DC converter 100 further comprises a first freewheeling circuit 110 forming an alternative current path to the current path through the first inductor L1. The function of the first freewheeling circuit 110 is to provide a loop operation during a ramp up, i.e., before a steady state is reached. The first freewheeling circuit 110 comprises a first diode D1 coupled in series with a ninth switch M9. The first freewheeling circuit 110 is coupled in parallel with the first inductor L1 between the second full bridge 160 and the first side $S1_{P2}$ of the second port P2. In the example shown in FIG. 1, this means that the first freewheeling circuit 110 is coupled between a first 112 and a second 114 connection points of the first freewheeling circuit 110, were the first connection point 112 is coupled to the third connection point 166 of the second full bridge 160 and the second connection point 114 is coupled to the upper side of the first side $S1_{P2}$ of the second port P2.

In examples of the present disclosure, the DC-to-DC converter 100 further comprises a first protection circuit 120 configured to protect the switches M5, M6, M7, M8 of the second full bridge 160 from overvoltage or overcurrent e.g., caused by energy stored in the first inductor L1 and release during a power supply failure. The first protection circuit 120 may be coupled between the second full bridge 160 and the first side $S1_{P2}$ of the second port P2 and in parallel with the second full bridge 160. With reference to FIG. 1, the first protection circuit 120 may have a first 122 and a second 124 connection point, where the first connection point 122 is coupled to the third connection point 166 of the second full bridge 160 and the second connection point 124 is coupled to the fourth connection point 168 of the second full bridge 160.

In examples of the present disclosure, the first protection circuit 120 may comprise a first Zener diode Z1 and a second Zener diode Z2 coupled in series with each other and in opposite directions to each other, as shown in FIG. 1. Alternatively, the first protection circuit 120 may comprise a first varistor which however is not shown in the Figs. The voltage rating of the first and second Zener diodes and the first varistor should be smaller than the voltage rating of switches M5, M6, M7, M8.

Figure 2:
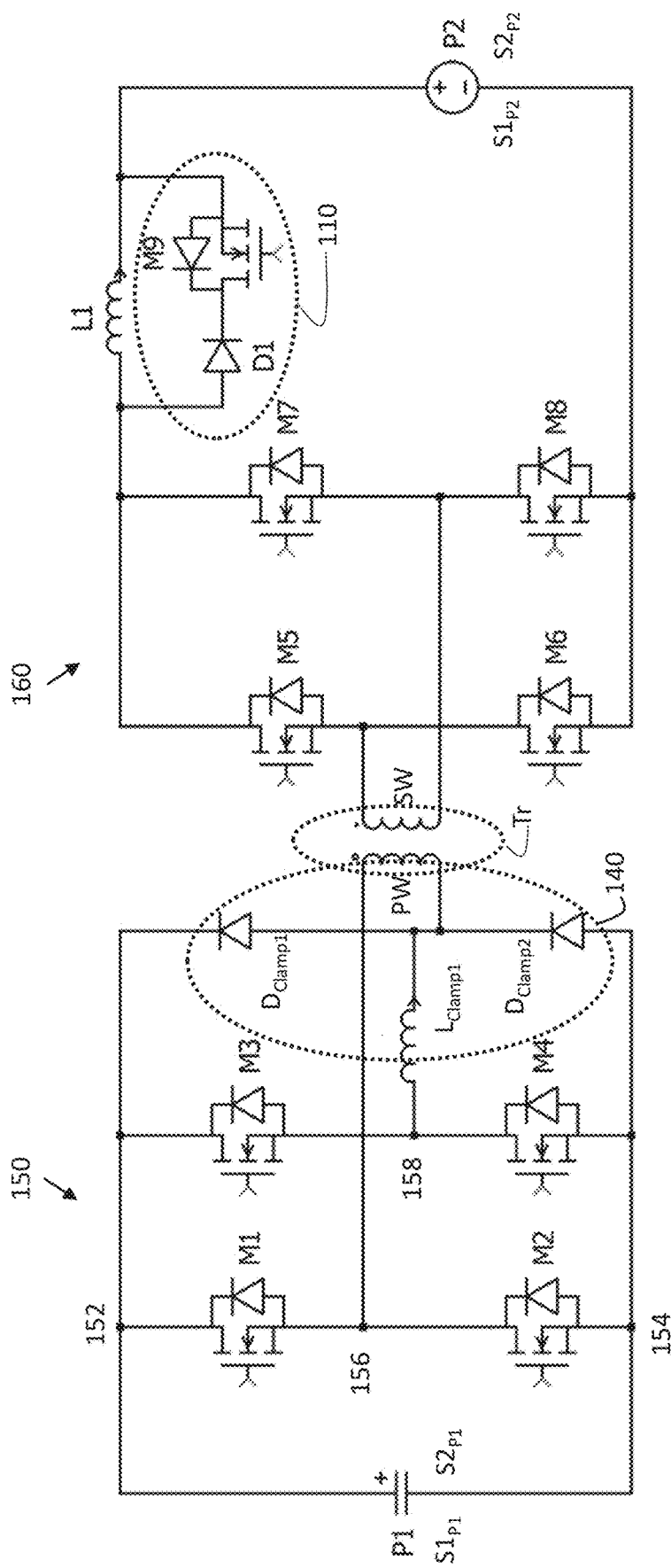
FIG. 2 shows a DC-to-DC converter with a two port topology according to some embodiments.

FIG. 2 shows a DC-to-DC converter 100 with a two port topology comprising a clamp circuit 140 according to some embodiments. In addition to the parts described with reference to the DC-to-DC converter 100 shown in FIG. 1, the DC-to-DC converter 100 shown in FIG. 2 further comprises a clamp circuit 140. The clamp circuit 140 comprising a first clamp diode $D_{Clamp1}$, a second clamp diode $D_{Clamp2}$ and a clamp inductor $L_{Clamp}$ coupled between the first full bridge 150 and the primary winding PW of the transformer Tr.

With reference to FIG. 2, the first clamp diode $D_{Clamp1}$, may be coupled between the first connection point 152 of the first full bridge 150 and a lower side of the primary winding PW of the transformer Tr, the second clamp diode $D_{Clamp2}$ may be coupled between the second connection point 154 of the first full bridge 150 and the lower side of the primary winding PW of the transformer Tr, and the clamp inductor $L_{Clamp}$ may be coupled between the fourth connection point 158 of the first full bridge 150 and the lower side of the primary winding PW of the transformer Tr.

The function of the clamp circuit 140 is to reduce overshoot voltage on switches M5 and M8.

Figure 3:
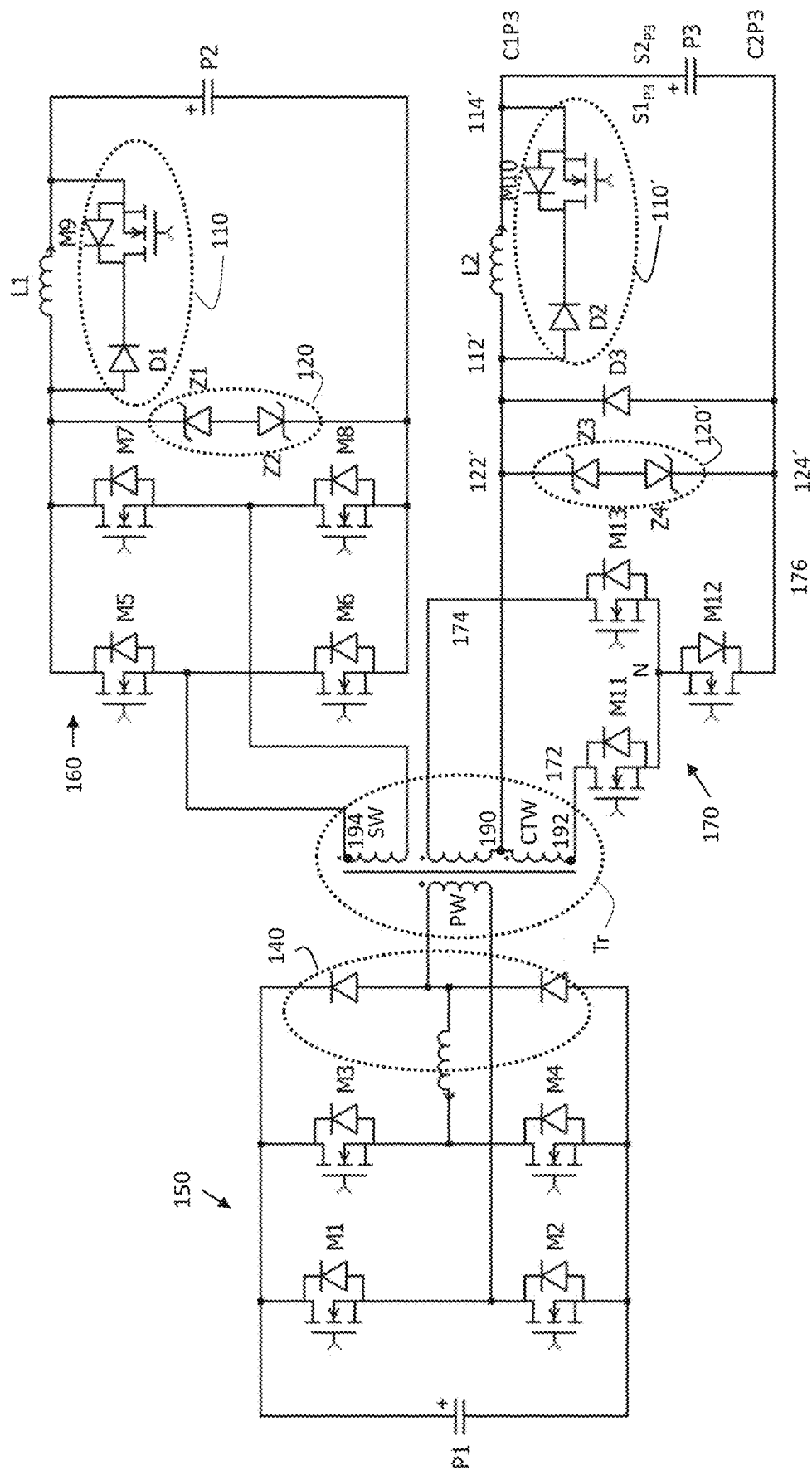
FIG. 3 shows a DC-to-DC converter with a three port topology according to some embodiments.

FIG. 3 shows a DC-to-DC converter 100 with a three port topology according to some embodiments. Therefore, the DC-to-DC converter 100 further comprises a third port P3 comprising a first side $S1_{P3}$ coupled to a Y-circuit 170 via its first C1P3 and second C2P3 connection points and a second side $S2_{P3}$ configured to be coupled to a second battery 206 (shown in FIG. 4). The Y-circuit 170 is coupled to a centre tapped winding CTW of the transformer Tr and comprises an eleventh switch M11, a twelfth switch M12 and a thirteenth switch M13.

In examples of the invention, the source pin or emitter pin of each switch is coupled to a common node N of the Y-circuit 170 and the common node N is coupled to a first connection point 190 of the centre tapped winding CTW. Furthermore, a first 172 point of the Y-circuit 170 is coupled to second connection point 192 of the centre tapped winding CTW and a second 174 connection point of the Y-circuit 170 is coupled to a third connection point 194 of the centre tapped winding CTW of the transformer Tr, while a third connection point 176 of the Y-circuit 170 is coupled to a second connection point C2P3 of the third port P3, as shown in FIG. 3.

The function of the Y-circuit 170 together with the third diode D3 and the second inductor L2 is to form a local buck converter and to be able to control the output voltage of the third port P3 when the third port P3 is configured as an output port.

The DC-to-DC converter 100 further comprises a second inductor L2 coupled between the Y-circuit 170 and the first connection point C1P3 of the third port P3 and a second freewheeling circuit 110' comprising a second diode D2 coupled in series with a tenth switch M10. The second freewheeling circuit 110' is coupled in parallel with the second inductor L2 between the Y-circuit 170 and the first side $S1_{P3}$ of the third port P3.

In the example shown in FIG. 3, this means that the second freewheeling circuit 110' is coupled between a first 112' and a second 114' connection point of the second freewheeling circuit 110', were the first connection point 112' is coupled to a centre of the centre tapped winding CTW of the transformer Tr and the second connection point 114' is coupled to an upper side of the first side $S1_{P3}$ of the third port P3. Other positions of the second inductor L2 and the second freewheeling circuit 110' are also possible, as will be further described below with reference to FIGS. 8-10.

In a similar way as for the first freewheeling circuit 110, the second freewheeling circuit 110' forms an alternative current path. In this case, an alternative current path to the current path through the second inductor L2.

In examples of the invention, the three port topology in FIG. 3 further comprises a second protection circuit 120' coupled between the Y-circuit 170 and the first side $S1_{P3}$ of the third port P3. When the third port P3 is operating as an input port, the second protection circuit 120' may be acting as a freewheeling circuit, thereby protecting the Y-circuit 170 from overvoltage or overcurrent caused by energy stored in the second inductor L2 and released during a power supply failure. The voltage rating of the components in the second protection circuit 120' should be smaller than the voltage rating of switches M11 and M12.

With reference to FIG. 3, the second protection circuit 120' may have a first 122' and a second 124' connection point, where the first connection point 122' is coupled to a centre of the centre tapped winding CTW of the transformer Tr and the second connection point 124' is coupled to third connection point 176 of the Y-circuit 170. The second protection circuit 120' may comprise a third Zener diode Z3 and a fourth Zener diode Z4 coupled in series with each other and in opposite directions, as shown in FIG. 3. Alternatively, the second protection circuit 120' may comprise a second varistor (not shown in the Figs.).

The DC-to-DC converter 100 with the three port topology may further comprise a freewheeling diode D3 coupled in parallel with the second protection circuit 120' and forming a freewheeling path when the third port P3 operate as an output port. Thus, the freewheeling diode D3 may act as a freewheeling diode when current is running from the first port P1 to the third port P3 or from the second port P2 to the third port P3 since when switch M12 is turned off the current of the second inductor L2 will flow via the freewheeling diode D3 instead via switch M12. The freewheeling diode D3 is coupled in parallel with the second protection circuit 120' and may hence be coupled between the first 122' and the second 124' connection points of the second protection circuit 120', as shown in FIG. 3.

It is noted that the three port topology in FIG. 3, in some embodiments, also comprises a clamp circuit 140, such as the one disclosed in FIG. 2 and explained previously, but is not limited thereto. Furthermore, any one of the above described examples of the DC-to-DC converter 100 may include one or more clamp circuits 140, as well as one or more first 120 and/or second 120' protection circuits.

Figure 4:
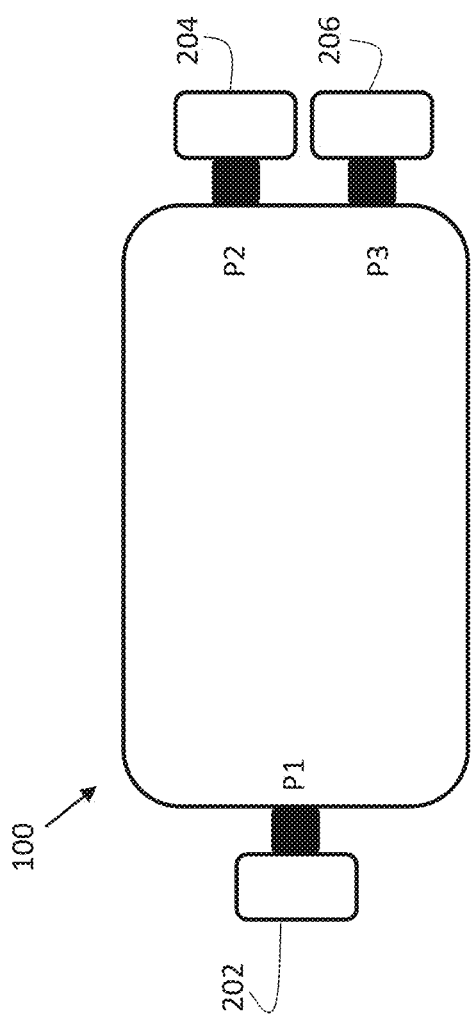
FIG. 4 shows an example of how the DC-to-DC converter can be coupled to external devices.

FIG. 4 shows non-limiting examples of how the DC-to-DC converter 100 can be coupled to different external devices. In a general case, the DC-to-DC converter 100 comprises a first port P1 which is configured to be coupled to the DC bus 202 and a second port P2 which is configured to be coupled to the first battery 204. The first battery 204 can be a high voltage battery. The DC-to-DC converter 100 can operate in a forward mode in which the current runs from the first port P1 to the second port P2. The DC-to-DC converter 100 can also operate in a backward mode in which the current runs in the opposite direction, i.e., from the second port P2 to the first port P1.

In examples, the DC-to-DC converter 100 further comprises a third port P3 as previously disclosed. The third port P3 is configured to be coupled to the second battery 206. Hence, the DC-to-DC converter 100 can also operate in a second backward mode in which the current runs in the direction from the third port P3 to the first port P1. However, the current can also run from the second port P2 to the third port P3 or from the third port P3 to the second port P2. When the DC-to-DC converter 100 comprises the third port P3 coupled to the second battery 206, the first battery 204 may be a high voltage battery and the second battery 206 may be a low voltage battery. High voltage can herein mean voltage over 100 V and low voltage can mean voltage below 100 V. Also, other values defining high voltage and low voltage are possible and within the scope of the present disclosure.

Further details related to the operation of the two port and three port DC-to-DC converter 100 in forward and backward modes will now be described with reference to FIGS. 5 and 6.

The DC-to-DC converter 100 with the two port topology may operate in a first backward mode BM1 in which energy is transferred from the second port P2 to the first port P1, i.e., the current direction is from the second port P2 to the first port P1. When the DC-to-DC converter 100 operates in the first backward mode BM1 in the current direction from the second port P2 to the first port P1, the DC-to-DC converter 100 may be configured to i) operate the ninth switch M9 in its saturation region; and
ii) switch ON the fifth M5 and the eight M8 switches during a first time period,
iii) switch OFF the fifth M5, the sixth M6, the seventh M7 and the eight M8 switches during a second timer period succeeding the first time period, and
iv) switch ON the sixth M6 and the seventh M7 switches during a third time period succeeding the second time period,
v) switch OFF the fifth M5, the sixth M6, the seventh M7 and the eight M8 switches during a fourth timer period succeeding the third time period; and
repeat ii) to v) until a voltage at the DC bus 202 is equal to or above a first threshold voltage.

The switches or switching elements in this disclosure can be silicon metal oxide semiconductor field effect transistor (MOSFET), silicon carbide MOSFET, insulated gate bipolar transistor (IGBT) and gallium nitride power transistor. Therefore, that a switch operates in its saturation region is well known to the skilled person.

In the first backward mode BM1, the DC-to-DC converter 100 operates with a soft start procedure. With the soft start procedure of the DC-to-DC converter 100, the voltage at the first port P1 may, prior to steady state operation, be charged to the same or approximately the same voltage as the first threshold voltage at the second port P2, i.e., the capacitance of the first port P1 is charged from zero voltage to the same or approximately the same voltage as the first threshold voltage at the second port P2. Thereby, inrush current into the first port P1 which could break or destroy the first port P1 can be avoided. The value of the first threshold voltage may be given as $$\text{first threshold voltage} = V_2/N_2 * N_1$$

where $V_2$ is the battery voltage at the second port P2, $N_1$ is the number of windings of the primary winding, and $N_2$ is the number of windings of the secondary winding.

During the soft start procedure, the ninth switch M9 is in step (i) half turned on, i.e., working in its saturation region. Thereby, a freewheeling path is provided for the first inductor L1 current and the first inductor L1 is demagnetized. The switches M1, M2, M3, M4 of the first full bridge 150 are turned off during soft start and only conduct current via their respective body diodes.

Figure 5:
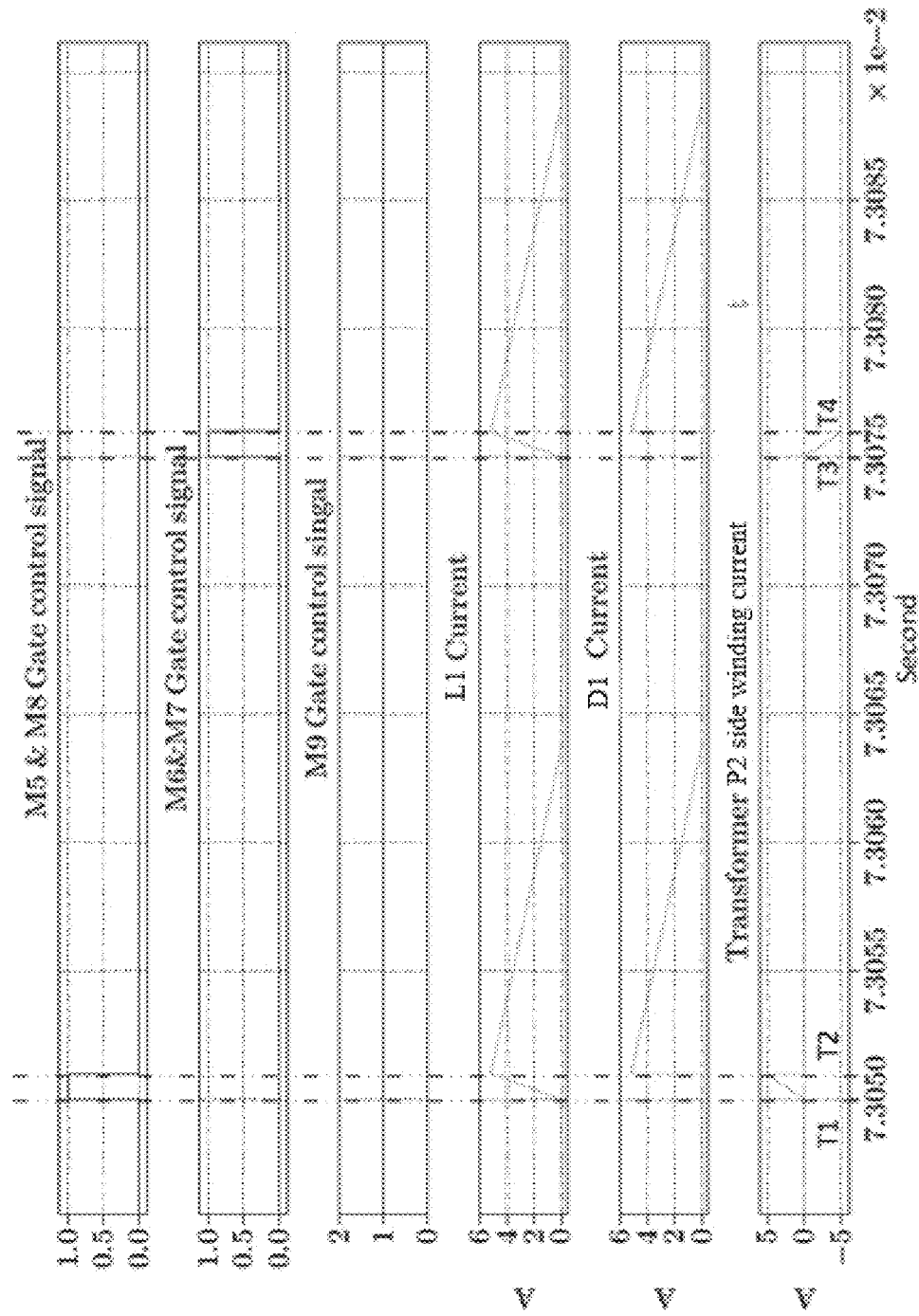
FIG. 5 shows a timing diagram according to some embodiments.

FIG. 5 shows a timing diagram for the DC-to-DC converter 100 operating in the first backward mode BM1, where the DC-to-DC converter 100 has a two port topology with a clamp circuit 140, as shown in FIG. 2. In FIG. 5, the gate control signals of the switches M5, M6, M7, M8 of the second full bridge 160 and the ninth switch M9 are shown, as well as the current of the first inductor L1, the first diode D1 and the second winding SW of the transformer Tr (denoted Transformer P2 side winding in FIG. 5).

As shown in FIG. 5, both the fifth M5 and the eight M8 switches are turned on during a first time interval between a first time instance T1 and a second time instance T2, this step corresponds to step (ii) described above. The current is flowing via the first inductor L1, the fifth switch M5, the eight switch M8, and the secondary winding SW of the transformer Tr and the energy is transferred to the first port P1 via the body diode of the first switch M1, the second clamp diode $D_{Clamp2}$ and the primary winding PW of the transformer Tr.

During a second time interval between the second time instance T2 and a third time instance T3, the fifth M5 to eight M8 switches are turned off, corresponding to step (iii). The current is flowing via the freewheeling current path of the first freewheeling circuit 110, i.e. through the first diode D1 and the ninth switch M9. The purpose of step (iii) is to demagnetize the first inductor L1, i.e. to reduce the current of the first inductor L1.

During a third time interval between the third time instance T3 and a fourth time instance T4, the sixth M6 and the seventh M7 switches are turned on, corresponding to step (iv). The current is flowing via the first inductor L1, the secondary winding SW of the transformer Tr, the sixth switch M6 and the seventh switch M7. The energy is transferred to the first port P1 via the body diode of switch M2, the first clamp diode $D_{Clamp1}$ and the primary winding PW of the transformer Tr.

After the fourth time instance T4, the fifth M5 to eight M8 switches are turned off again before a fourth time interval before turning on the fifth M5 and the eight M8 switches again. During the fourth time interval the current flows via the freewheeling current path of the first freewheeling circuit 110, i.e. through the first diode D1 and the ninth switch M9. The procedure is repeated until the voltage of the first port P1 is within the first threshold voltage.

The DC-to-DC converter 100 with the three port topology may operate in a forward mode in a current direction from the first port P1 to the second port P2 and the third port P3.

Furthermore, the switches M1, M2, M3, M4 of the first full bridge 150 may be phase shift controlled, e.g., by means of control signals of the first M1 and second M2 switches being inverted from each other, and control signals of the third M3 and fourth M4 switches also being inverted from each other. The output voltage of the second port P2 may be modulated by changing the phase shift angle between the gate control signals of the first M1 and third M3 switches. At the forward mode the switches M5, M6, M7, M8 of the second full bridge 160 are working in synchronous rectification mode.

The output voltage of the third port P3 may be modulated by changing the duty ratio of the twelfth switch M12, and the control signals of the first M1 and twelfth M12 switches are synchronized so that they are turned on at the same time. The eleventh M11 and thirteens M13 switches are working in synchronous rectification mode.

The voltage relation at the different ports P1, P2, P3 can be expressed as follows:

$V_1$ is the voltage at the first port P1 according to:

$$V_1 = \frac{N_1}{N_3} \cdot \frac{V_3}{2 \cdot (1-D)}, \quad D > 0.5$$

$V_2$ is the voltage at the second port P2 according to:

$$V_2 = \frac{V_1}{N_2} \cdot N_2 \cdot \frac{P_{eff}}{\pi}, \quad P_{eff} < \pi$$

$V_1$ is the voltage at the first port P1 according to:

$$V_1 = \frac{N_1}{N_2} \cdot \frac{V_2}{2 \cdot (1-D)}, \quad D > 0.5$$

$V_3$ is the voltage at the third port P3 according to:

$$V_3 = \frac{V_1}{N_1} \cdot N_3 \cdot 2 \cdot D_{M12}, \quad D_{12} < 0.5$$

where $V_1$ is the voltage at the first port P1, $V_2$ is the voltage at the second port P2, $V_3$ is the voltage at the third port P3, $N_1$ is the number of windings of the primary winding PW, and $N_2$ is the number of windings of the secondary winding SW, $N_3$ is the number of windings of the centre tapped winding CTW, $P_{eff}$ is the effective phase shift angle, $D_{M12}$ is the duty rate of switch M12, and D is the duty ratio of switches M5 to M8 or switch M11 and M13.

The DC-to-DC converter 100 with the three port topology may operate in a second backward mode BM2 in a current direction from the third port P3 to the first port P1. When the DC-to-DC converter 100 is operating in the second backward mode BM2 in the current direction from the third port P3 to the first port P1, the DC-to-DC converter 100 may be configured to:

i) control the tenth switch M10 to operate in its saturation region, and ii) switch ON the twelfth switch M12; and iii) switch ON the eleventh switch M11 during a first time period, iv) switch OFF the eleventh M11 and the thirteenth M13 switches during a second timer period succeeding the first time period, and v) switch ON the thirteenth switch M13 during a third time period succeeding the second time period, vi) switch OFF the eleventh M11 and the thirteenth M13 switches during a fourth timer period succeeding the third time period; and repeat steps (iii) to (vi) until a voltage at the DC bus 202 is equal to or above a second threshold voltage.

Figure 6:
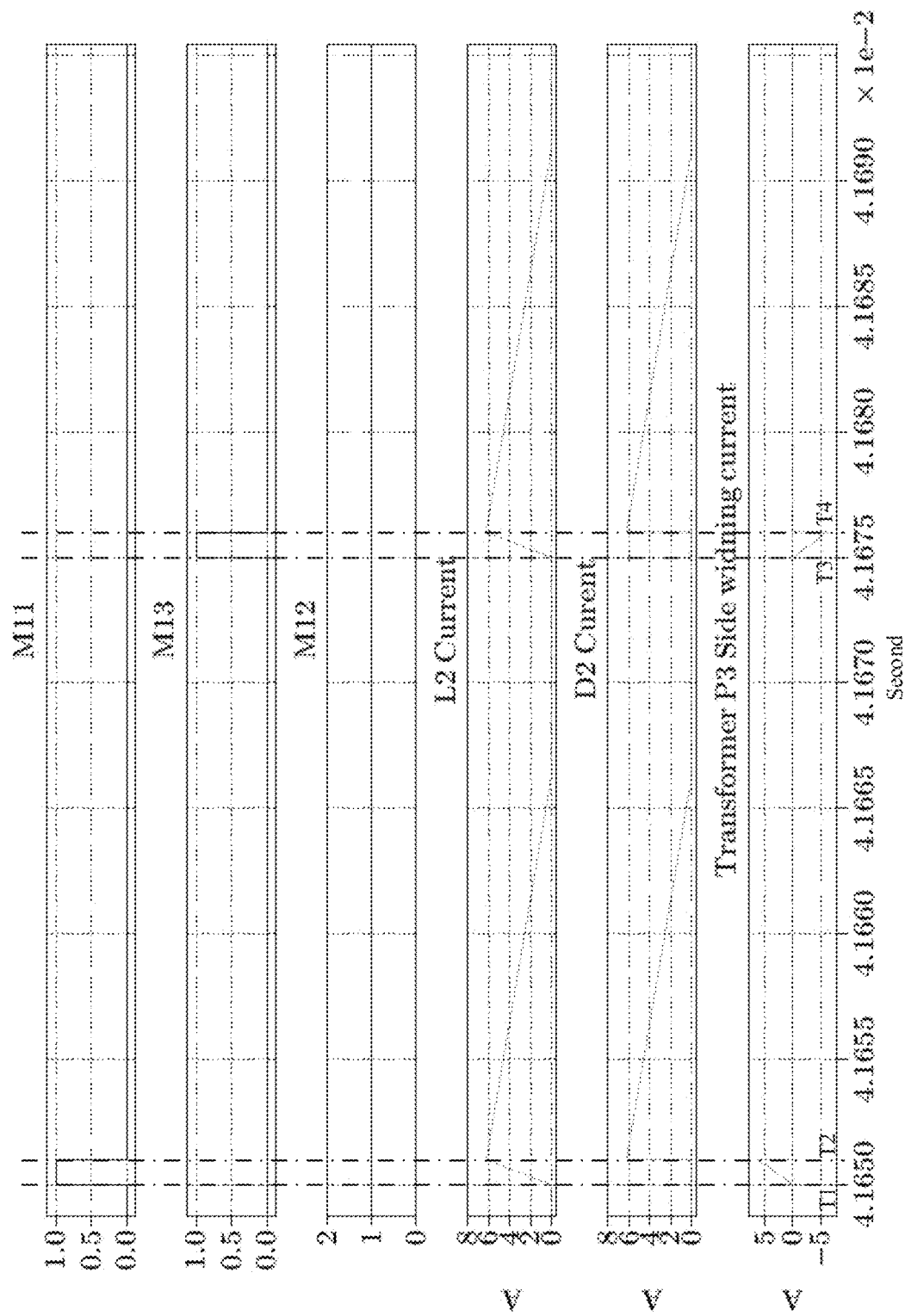
FIG. 6 shows a timing diagram according to some embodiments.

FIG. 6 shows a timing diagram for switches M11, M12, M13, and currents over the second inductor L2, the second diode and the centre tapped winding. During the second backward mode BW2 mode, switch M10 is controlled to operate in its saturation region and switch M12 is turned on all the time. During the time interval between first T1 and second T2 time instances, switch M11 is turned on, and the current during this time interval at the third port P3 is conducting via the second inductor L2 and switches M11 and M12, and at the first port P1, the current is feed into input capacitor of P1 via body diodes of switches M3 and M2. Switch M11 is turned off at the second time instance T2, and during the time interval between second T2 and third T3 time instances, the current at the third port P3 is flowing via the second inductor L2, the second diode D2 and switch M10. Switch M13 is turned on during the time interval between the third T3 and fourth T4 time instances, and the current path at the third port P3 is conductive via the second inductor L2 and switches M13 and M12, and the current at the first port P1 is flowing via body diodes of switches M1 and M4 into input the capacitor of the first port P1. Switch M13 is turned off at the fourth time instance T4, and after the fourth time instance T4 the current on port side is conduct via the second inductor L2, the second diode D2 and the tenth switch M10. These procedures are repeated until voltage at the DC bus 202 is equal to or above a second threshold voltage. The value of the second threshold voltage can be given as second threshold voltage=$V_3/N_3*N_1$ where $V_3$ is the battery voltage at the third port P3, $N_1$ is the number of windings of the primary winding, and $N_3$ is the number of windings of the centre tapped winding CTW.

Figure 7:
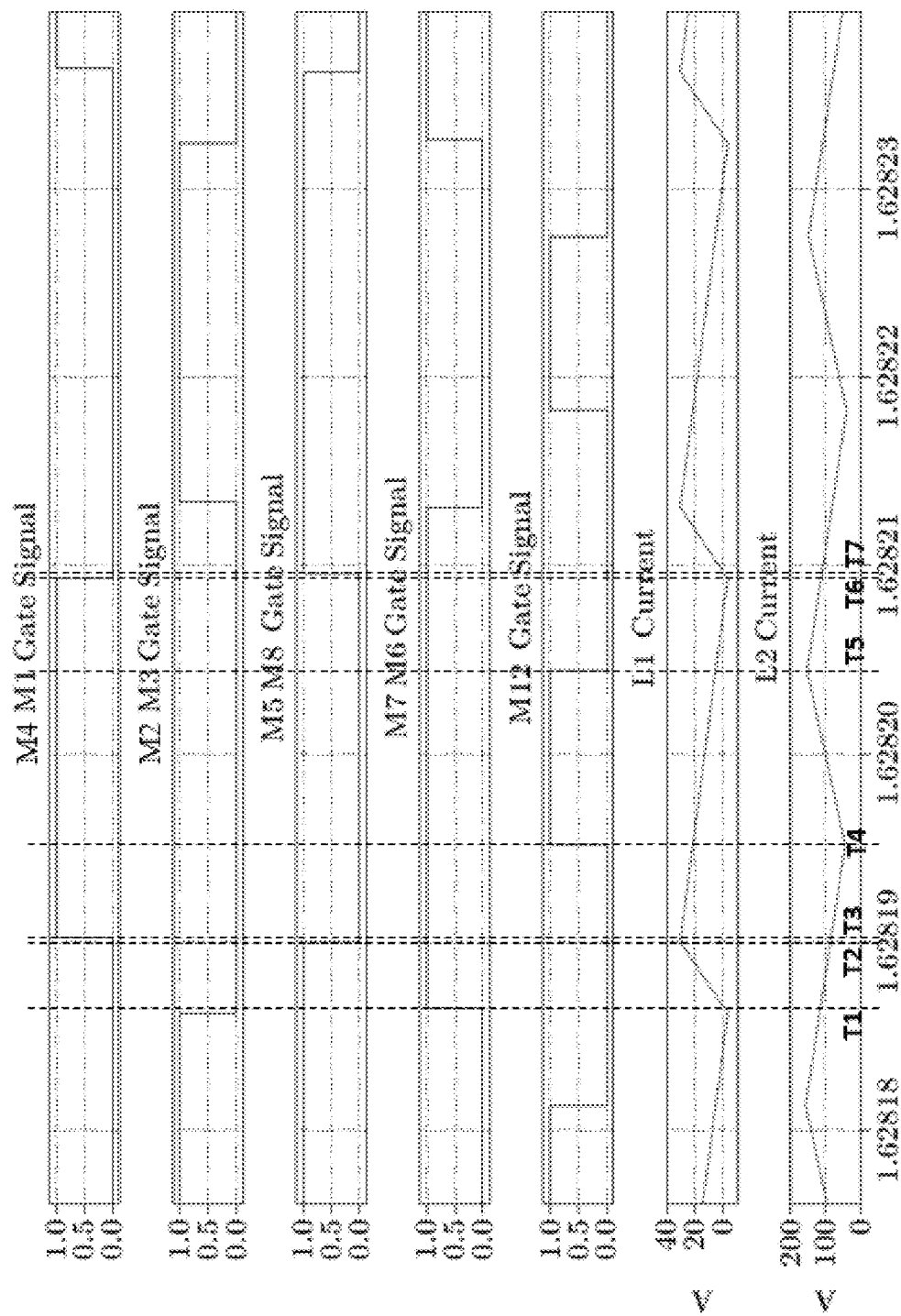
FIG. 7 shows a timing diagram according to some embodiments.

The DC-to-DC converter 100 with the three port topology may further operate in a third backward mode BM3 in a current direction from the second port to the first port P1 and to the third port P3. FIG. 7 shows a timing diagram for the DC-to-DC converter 100 operating in the third backward mode BM3. In FIG. 7, the gate control signals of the switches M1 to M8 and M12, as well as the current of the first inductor L1 and the second inductor L2.

In the third backward mode BM3, the ninth M9 and tenth M10 switches are turned off which is not shown in FIG. 7.

During a first time interval between a first time instance T1 and a second time instance T2, the switches M5, M6, M7, M8 of the second full bridge 160 are turned on and the secondary winding SW of the transformer Tr is shorted. The first inductor L1 current increases during the first time interval, as shown in FIG. 7.

At the second time instance, the fifth M5 and eight M8 switches are turned off. The current is starting to flow via the secondary winding SW of the transformer Tr and the energy is transferred to the first port P1 via the primary winding PW of the transformer Tr and the first M1 and fourth M4 switches. The first M1 and fourth M4 switches are turned on between a third time instance T3 and a sixth time instance T6, to have synchronous rectification and reduce losses. The first inductor L1 current is controlled to below zero at the sixth time instance T6.

The first M1 and fourth M4 switches are further turned off at the sixth time instance T6, before the fifth M5 and eight M8 switches are turned on a seventh time instance T7. When the first M1 and fourth M4 switches are turned off, at sixth time instance T6, the current is forced to stop conducting via the primary winding PW and the secondary winding SW of the transformer Tr. Thus, the current will start to flow via the body diodes of the fifth M5 and eight M8 switches between the sixth time instance T6 and the seventh time instance T7. At the seventh time instance T7, both the fifth M5 and eight M8 switches are hence turned on at zero voltage and has no turn on losses.

It is important that the low boundary of the second inductor L2 current is lower than zero to be able to achieve zero voltage at turn on of the fifth M5 and eight M8 switches, since the inductor current has a triangular shape. This modulation of keeping the low current boundary lower than zero is called triangular current modulation (TCM) and may comprise in examples:

The gate signals of switches M5 and M8 are the same and the gate signals of switches M6 and M7 are the same but phase shifted by 180 degrees in respect of the gate signals of switches M5 and M8. The duty ratio of switches M5, M6, M7, M8 is more than 0.5.

The third port P3 voltage and current modulation is done by controlling the duty ratio of the twelfth switch M12.

The low boundary of the current is controlled to be lower than zero, e.g., −3 A.

Turn the first M1 and fourth M4 switches off prior to turning on the fifth M5 and eight M8 switches to achieve zero voltage turn on of the fifth M5 and eight M8 switches.

To be able to control the low boundary of the second inductor L2 current, an additional control loop based on a low current boundary controller may be added into the control loop. The input of the low current boundary controller may be a measured low current boundary value and the output of the low current boundary controller may be a switching frequency for the switches of the present converter. The measured low current boundary values may be obtained by one or more current sensors.

Thus, the DC-to-DC converter 100 may in examples of the invention further comprise one or more current sensors which may be used in a control loop to control low current boundary values of the first inductor L1 and/or the second inductor L2. The DC-to-DC converter 100 may hence further comprise at least one of a first current sensor 180 coupled between the second full bridge 160 and the first side $S1_{P2}$ of the second port P2 and configured to provide a first set of measured current values, a second current sensor 180' coupled between the Y-circuit 170 and the first side $S1_{P3}$ of the third port P3 and configured to provide a second set of measured current values, and a controller 130 configured to control the switches of the DC-to-DC converter 100 based on at least one of the first set of measured current values and the second set of measured current values.

Figure 8:
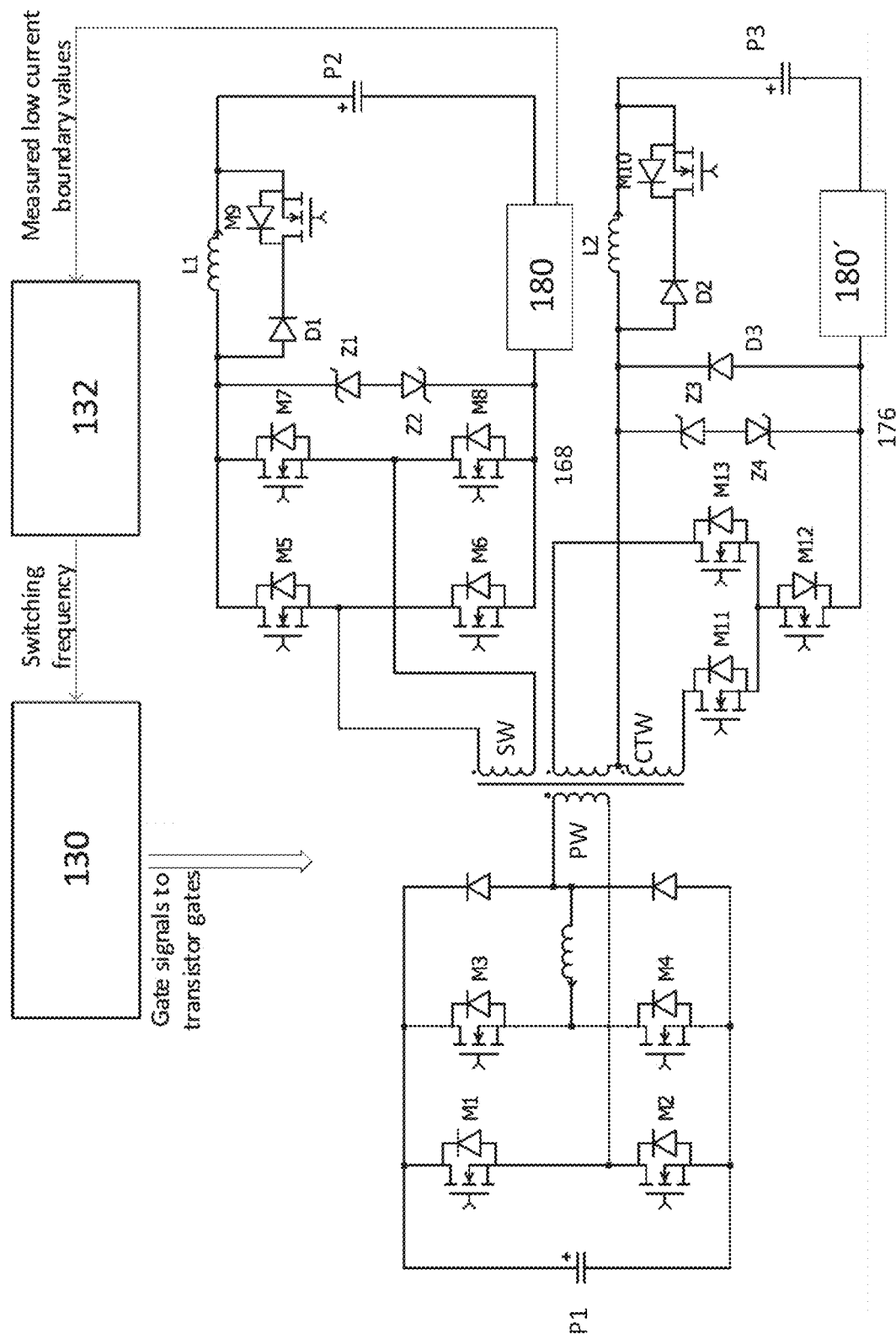
FIG. 8 illustrates a system overview of a DC-to-DC converter according to some embodiments.

FIG. 8 shows a three port DC-to-DC converter 100 with a first current sensor 180 and a second current sensor 180' according to some embodiments. The first current sensor 180 is coupled between the second full bridge 160 and the first side $S1_{P2}$ of the second port P2, e.g., between the fourth connection point 168 of the second full bridge 160 and the lower side of the first side $S1_{P2}$ of the second port P2. The second current sensor 180' is coupled between the Y-circuit 170 and the first side $S1_{P3}$ of the third port P3, e.g., between the third connection 176 of the Y-circuit 170 and the lower side of the first side $S1_{P3}$ of the third port P3.

The first current sensor 180 and the second current sensor 180' provide a first set of measured current values and a second of measured current value, respectively, to a low current boundary controller 132. The controller 132 is configured to determine a switching frequency for the switches of the DC-to-DC converter 100 based on the first and second set of measured current values received from the current sensors 180, 180'. The switching frequency is provided to the controller 130 which controls the switches of the DC-to-DC converter 100 by providing gate control signals to the transistor gates of the switches. In this way, the controller 130 can control the switches of the DC-to-DC converter 100 based on the first and second set of measured current values.

It is realised that the two port and three port topologies of the DC-to-DC converter 100 discussed previously can be varied within the scope of the invention. Therefore, in the following disclosure non-limiting examples of exemplary three port topologies are presented.

Figure 9:
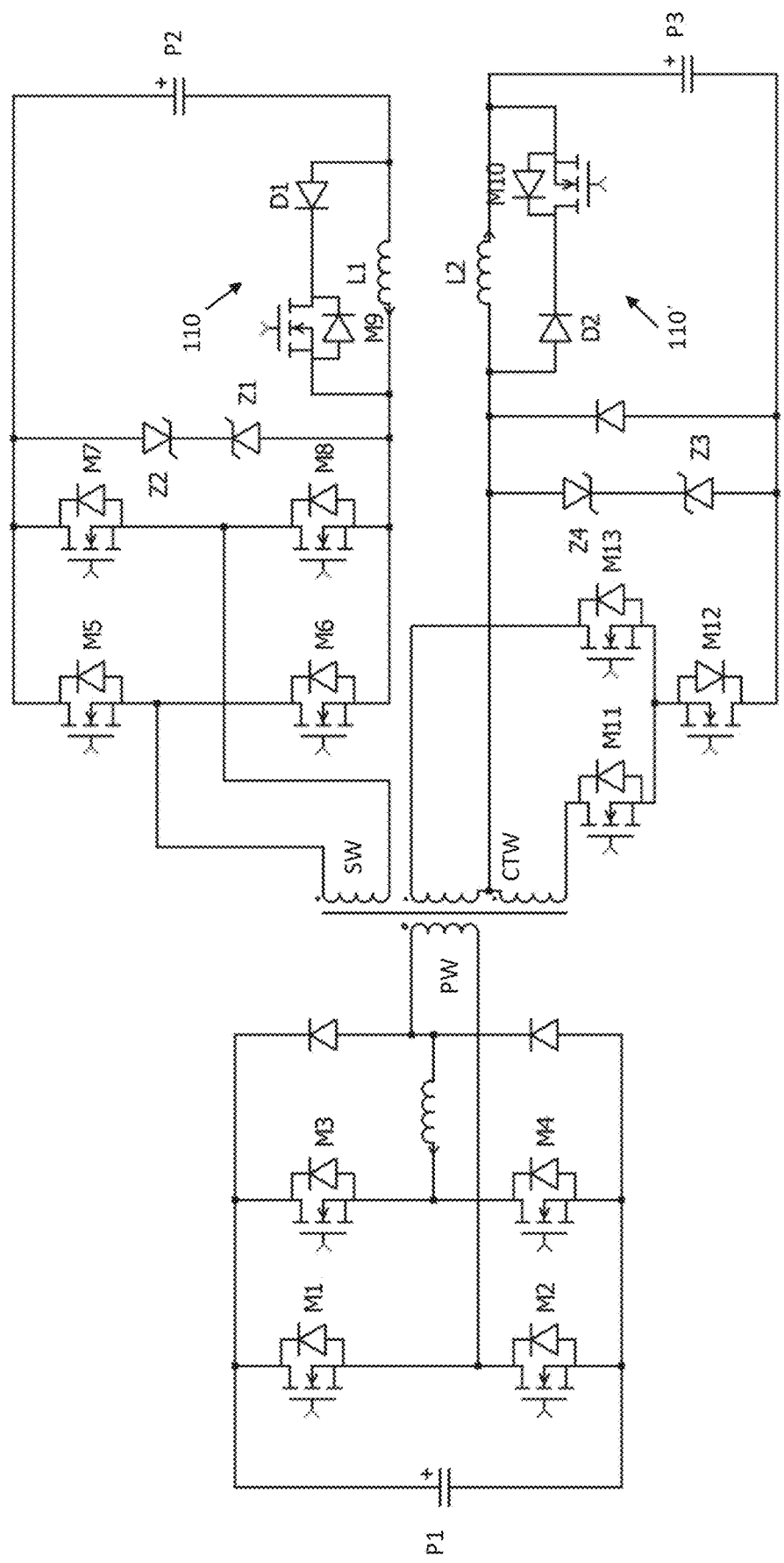
FIG. 9 shows a DC-to-DC converter with a three port topology according to some embodiments.

In FIG. 9, the location of the first inductor L1 and the first freewheeling circuit 110 (the first diode D1 and the ninth switch M9) has been changed compared to the topology previously shown. In the example shown in FIG. 9, the first inductor L1 and the first freewheeling circuit 110 are connected to the low voltage side of the second port P2. However, this modification is considered as an equivalent circuit to the one shown in FIG. 3 in respect of its functioning.

Figure 10:
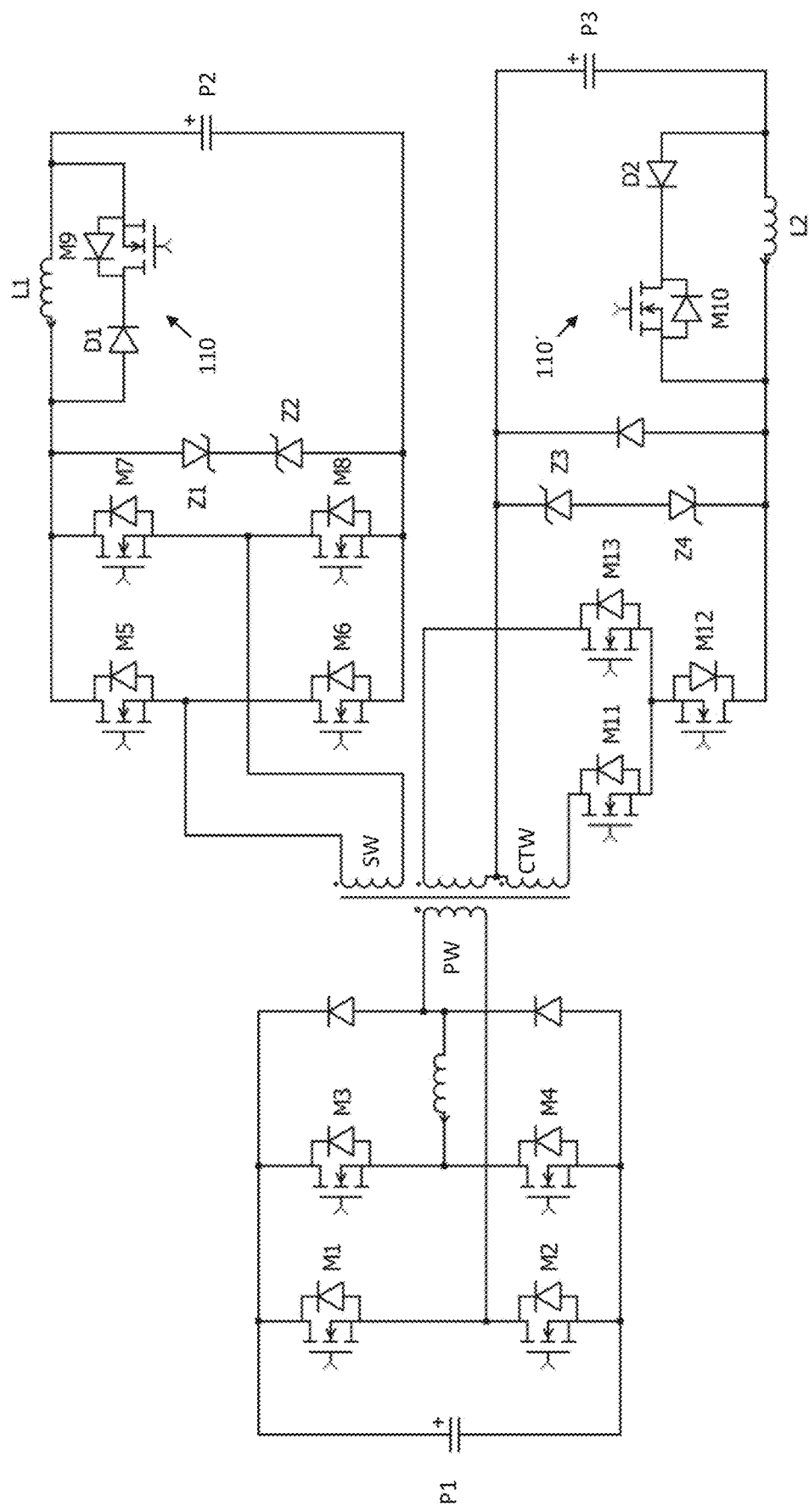
FIG. 10 shows a DC-to-DC converter with a three port topology according to some embodiments.

In FIG. 10, the location of the second inductor L2 and the second freewheeling circuit 110' (the second diode D2 and the tenth switch M10) has been changed compared to the topology previously shown. In the example shown in FIG. 10, the second inductor L2 and the second freewheeling circuit 110' are connected to the low voltage side of the third port P3. However, this modification is also considered as an equivalent circuit to the one shown in FIG. 3 in respect of its functioning.

Figure 11:
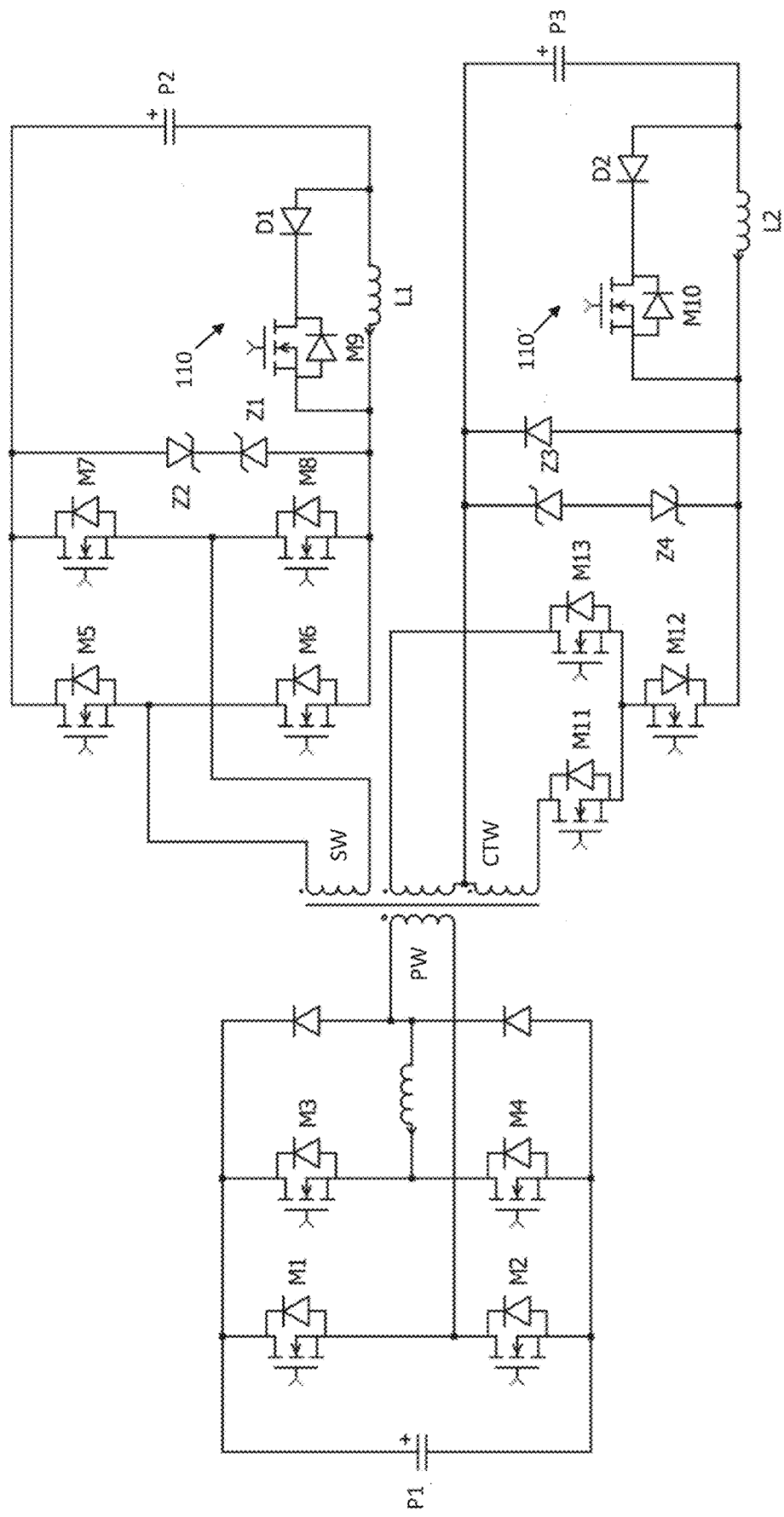
FIG. 11 shows a DC-to-DC converter with a three port topology according to some embodiments.

In FIG. 11. the location of the first inductor L1, the second inductor L2, the first freewheeling circuit 110, and the second freewheeling circuit 100' have been changed compared to the topology previously shown. In the example shown in FIG. 11, mentioned components and circuits are coupled to the low voltage side of the second port P2 and the third port P3, respectively. However, this modification is also considered as an equivalent circuit to the one shown in FIG. 3 in respect of its functioning.

It is finally noted that the three port topologies shown in FIGS. 8 to 10 can comprise one or more of the previously mentioned first protection circuit 120, second protection circuit 120', clamp circuit 140 and freewheeling diode D3.

The processor(s) of the controller 130 and the low current boundary controller 132 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present disclosure is not limited to the examples described above, but also relates to and incorporates all examples within the scope of the appended independent claims.

The invention claimed is:

1. A DC-to-DC converter comprising:
   a first port comprising a first side configured to be coupled to a DC bus and a second side coupled to a first full bridge, wherein the first full bridge comprises a first switch, a second switch, a third switch and a fourth switch;
   a transformer comprising a primary winding coupled to the first full bridge and a secondary winding coupled to a second full bridge, wherein the second full bridge comprises a fifth switch, a sixth switch, a seventh switch and an eighth switch;
   a second port comprising a first side coupled to the second full bridge and a second side configured to be coupled to a first battery;
   a first inductor coupled between the second full bridge and the first side of the second port;
   a first freewheeling circuit comprising a first diode coupled in series with a ninth switch, wherein the first freewheeling circuit is coupled in parallel with the first inductor between the second full bridge and the first side of the second port; and
   a third port comprising a first side coupled to a Y-circuit and a second side configured to be coupled to a second battery, wherein the Y-circuit is coupled to a centre tapped winding of the transformer and comprises an eleventh switch, a twelfth switch, and a thirteenth switch.

2. The DC-to-DC converter according to claim 1, wherein, when operating in a first backward mode in a current direction from the second port to the first port, is configured to:
   operate the ninth switch in its saturation region; and
   repeat until a voltage at the DC bus is equal to or above a first threshold voltage:
   switch ON the fifth switch and the eighth switch during a first time period;
   switch OFF the fifth switch, the sixth switch, the seventh switch, and the eighth switch during a second time period succeeding the first time period;
   switch ON the sixth switch and the seventh switch during a third time period succeeding the second time period; and
   switch OFF the fifth switch, the sixth switch, the seventh switch, and the eighth switch during a fourth timer period succeeding the third time period.

3. The DC-to-DC converter according to claim 1, further comprising:
   a first protection circuit coupled between the second full bridge and the first side of the second port and in parallel to the second full bridge.

4. The DC-to-DC converter according to claim 3, wherein the first protection circuit comprises at least one of:
   a first Zener diode and a second Zener diode coupled in series with each other and in opposite directions; or
   a first varistor.

5. The DC-to-DC converter according to claim 3, further comprising:
   a third port comprising a first side coupled to a Y-circuit and a second side configured to be coupled to a second battery, wherein the Y-circuit is coupled to a centre tapped winding of the transformer and comprises an eleventh switch, a twelfth switch, and a thirteenth switch.

6. The DC-to-DC converter according to claim 4, further comprising:
   a third port comprising a first side coupled to a Y-circuit and a second side configured to be coupled to a second battery, wherein the Y-circuit is coupled to a centre tapped winding of the transformer and comprises an eleventh switch, a twelfth switch, and a thirteenth switch.

7. The DC-to-DC converter according to claim 1, wherein a source pin or an emitter pin of each switch is coupled to a common node of the Y-circuit.

8. The DC-to-DC converter according to claim 1, wherein the first battery is a high voltage battery and the second battery is a low voltage battery.

9. The DC-to-DC converter according to claim 1, further comprising:
   a second inductor coupled between the Y-circuit and the first side of the third port; and
   a second freewheeling circuit comprising a second diode coupled in series with a tenth switch, wherein the second freewheeling circuit is coupled in parallel with the second inductor between the Y-circuit and the first side of the third port.

10. The DC-to-DC converter according to claim 9, wherein, when operating in a second backward mode in a current direction from the third port to the first port, is configured to:
    control the tenth switch to operate in its saturation region;
    switch ON the twelfth switch; and
    repeat until a voltage at the DC bus is equal to or above a second threshold voltage:
    switch ON the eleventh switch during a first time period;
    switch OFF the eleventh switch and the thirteenth switch during a second time period succeeding the first time period;
    switch ON the thirteenth switch during a third time period succeeding the second time period; and
    switch OFF the eleventh switch and the thirteenth switch during a fourth timer period succeeding the third time period.

11. The DC-to-DC converter according to claim 1, further comprising:
    a second protection circuit coupled between the Y-circuit and the first side of the third port.

12. The DC-to-DC converter according to claim 5, further comprising:
    a second protection circuit coupled between the Y-circuit and the first side of the third port.

13. The DC-to-DC converter according to claim 6, further comprising:

a second protection circuit coupled between the Y-circuit and the first side of the third port.

14. The DC-to-DC converter according to claim 11, wherein the second protection circuit comprises at least one of:
- a third Zener diode and a fourth Zener diode coupled in series with each other and in opposite directions; or
- a second varistor.

15. The DC-to-DC converter according to claim 11, further comprising:
- a freewheeling diode coupled in parallel with the second protection circuit and forming a freewheeling path when the third port operates as an output port.

16. The DC-to-DC converter according to claim 1, further comprising at least one of:
- a first current sensor coupled between the second full bridge and the first side of the second port and configured to provide a first set of measured current values;
- a second current sensor coupled between the Y-circuit and the first side of the third port and configured to provide a second set of measured current values; or
- a controller configured to control the switches of the DC-to-DC converter based on at least one of the first set of measured current values and the second set of measured current values.

17. The DC-to-DC converter according to claim 5, further comprising at least one of:
- a first current sensor coupled between the second full bridge and the first side of the second port and configured to provide a first set of measured current values;
- a second current sensor coupled between the Y-circuit and the first side of the third port and configured to provide a second set of measured current values; or
- a controller configured to control the switches of the DC-to-DC converter based on at least one of the first set of measured current values and the second set of measured current values.

18. The DC-to-DC converter according to claim 1, further comprising:
- a clamp circuit comprising a first clamp diode, a second clamp diode, and a clamp inductor coupled between the first full bridge and the primary winding of the transformer.

19. The DC-to-DC converter according to claim 3, further comprising:
- a clamp circuit comprising a first clamp diode, a second clamp diode, and a clamp inductor coupled between the first full bridge and the primary winding of the transformer.

* * * * *